Patented July 1, 1952

2,602,029

UNITED STATES PATENT OFFICE 2,602,029

MANUFACTURE OF BITUMINIZED FIBROUS PRODUCTS

Leonard Charles Bradshaw, Slough, England, assignor to International Bitumen Emulsions Limited, Slough, England, a company of Great Britain No Drawing. Application September 17, 1946, Serial No. 697,597. In Great Britain July 31, 1945

Section 1, Public Law 690, August 8, 1946
Patent expires July 31, 1965

6 Claims. (Cl. 92—21)

This invention relates to the production of boards, and the like, from fibrous material which has precipitated on it bituminous material so formulated that during the ultimate drying and baking it is hardened, thus producing compositions which are more resistant to the action of water, solvents, and heat, than would otherwise be the case.

Since it is an essential part of the invention that the articles shall undergo baking treatment, it is necessary to modify this baking treatment, and the composition of the bituminous material to conform with the heat resistance of the fibrous material being used. In the following description of the invention asbestos fibre has been taken as an example of the fibrous material, as its heat resistance allows of considerable scope in the maximum baking temperatures which can be used, thereby reducing the necessary period of baking. It is to be understood, however, that the invention is not limited to the use of those fibrous materials which will withstand the temperatures mentioned, since it is practicable to use fibrous material which would undergo deterioration at those temperatures (for example, paper), by carrying out the baking operation at lower temperatures for longer periods.

In accordance with the present invention, therefore, the bituminous material is modified by fluxing with it a proportion of fatty acid pitch; the term "fatty acid pitch" includes such substances as pitch, stearin pitch, bone tar pitch and the like and residues from the distillation of oils, and known in commerce as "vegetable oil residues," all of which can be made to polymerize when exposed to suitable conditions of temperature and time.

The suitably modified bituminous material is then emulsified in the manner to be described.

Alternatively, emulsions may be made of a bituminous material and of the modifier, and these two emulsions mixed prior to the addition to the fibrous material, or they may be introduced separately.

In certain cases, to accelerate the ultimate hardening sulphur and suitable accelerators may be incorporated either in the internal or external phase of the emulsion.

It has been found that in blending the bituminous material with the polymerizable material, the penetration of the blend may be so high that, when converted to an emulsion and used in the process as specified, trouble may be caused after the formation of the web by the web adhering to the pick-up rollers, felts and the like. In such cases, it is a part of the invention to overcome this disadvantage by the conversion of all or part of the fatty acid radicles in the polymerizable material to heavy metal or alkaline earth soaps before the emulsification of the blend.

Examples of emulsions which can be used in the invention are given herewith:

Example 1

100 parts by weight of vegetable oil residue are heated with 20 parts by weight of zinc oxide for 30 minutes at 200° C. 240 parts by weight of Trinidad asphalt are then added and the whole stirred, the temperature being maintained until the mixture is homogeneous. The flux is then cooled below 150° C. and 18 parts by weight of sulphur stirred in. This blend is then emulsified by running 150 parts by weight thereof into 50 parts by weight of hot water containing 5 parts by weight of sodium metasilicate and 1 part by weight of potassium hydroxide. The emulsion so formed is diluted with hot water to a total outturn of 300 parts by weight.

Example 2

An emulsion produced as described in Example 1 but with the Trinidad asphalt replaced by an equal quantity by weight of 15/25 penetration straight run petroleum bitumen.

Example 3

An emulsion produced as described in Example 1 but with the Trinidad asphalt replaced by an equal part by weight of 110° C.–120° C. softening point R. and B., straight run petroleum bitumen.

Example 4

An emulsion produced as described in Example 1 but with the vegetable oil residue replaced by equal parts by weight of medium soft stearin pitch.

Example 5

An emulsion produced as described in Example 1 but with the vegetable oil residue replaced by equal parts by weight of vegetable oil pitch.

Example 6

An emulsion produced as described in Example 1 but omitting the sulphur.

Example 7

200 parts by weight 80/90° C. softening point R. and B., straight run petroleum bitumen are fluxed with 100 parts by weight of medium hard stearin pitch. When fluxing is completed, the temperature is allowed to fall below 150° C. and 24 parts by weight of sulphur are added. 150 parts of this blend are then emulsified as in Example 1.

*Example 8*

| | Parts by weight |
|---|---|
| Medium coal tar pitch | 200 |
| Trinidad asphalt | 100 |
| Soft vegetable pitch | 150 |
| Sulphur | 36 | are employed. The medium coal tar pitch is fluxed with the Trinidad asphalt and soft vegetable pitch. The flux is cooled to 150° C. and sulphur added. 150 parts by weight of the final blend is then run into the emulsifying fluid at 100° C. consisting of:

| | Parts by weight |
|---|---|
| Argentine casein | 6 |
| 10% bentonite slurry | 30 |
| Caustic soda | 9 |
| Water | 30 |

The emulsion so formed is diluted with hot water to give an out-turn of 300 parts by weight.

The formation of these emulsions is, of course, modified according to the fibrous material to be used, which largely determines the ultimate temperatures of baking.

An example of a manufacturing process which may be used to produce the articles covered by this invention is as follows:

Utilising a single vat board machine, grade 46 asbestos is beaten in water for 30 minutes, the concentration of asbestos being 5%. At the end of this period the emulsion is run into the beater. It is found that the most thorough dispersion is obtained when the emulsion is added to the stream of asbestos pulp just before it flows under the beater roll. Sufficient emulsion is added to give a pulp containing equal parts of asbestos and bituminous-pitch binder composition. Beating is continued with the beater roll raised, until the emulsion has been thoroughly dispersed through the pulp. Aluminium sulphate solution is then added in sufficient quantity completely to precipitate the bituminous materials on the asbestos fibres. After the precipitation process is completed, the mix is diluted in the stuff chest to a consistency of between 0.5% and 1.0 solids. It is then fed in the usual manner to the board machine, from which sheets of any desired thickness may be taken off in a semi-dry condition. The board so produced in a semi-dry condition may be formed into corrugated sheets, sheets, tubes, or moulded into various shapes. They may be pressed and moulded under pressure.

It is an essential part of the drying process which follows that it should be gradual at first, the temperature not exceeding, say 90° C., and the heating being carried out in the presence of an edequate air flow, in order to remove the water without fluxing the bituminous material. If this condition is not observed, water will be trapped within the material and blistering will occur during the subsequent baking. After being subjected to the drying process, the articles or sheets are baked at a higher temperature (150° C. to 170° C.) for a number of hours, according to the class of finish required. In certain cases it may be desirable to finish with a further hot pressing.

As an alternative to the above, the sheets in the semi-dry condition may be passed and subjected immediately to the low temperature drying previously described. Having been dried, the sheets may then be formed into corrugated sheets, tubes, or moulded shapes while still warm, with or without the use of hot presses, and then given the ultimate baking treatment. As an example of this baking treatment, temperatures of 150°–170° C. over a period of 7 hours may be used.

It is emphasised that the baking treatment will depend upon the desired finish, as hardening will increase with continued baking.

If desired the sheets may be moulded into the required shapes during or at the end of the baking period while they are still hot.

Alternatively, if the machine be a continuous one, the board may be dried at low temperatures, reeled up and stored in this condition until it is required for moulding and ultimate baking.

It is practicable to apply baking enamels to the articles at the interim stage during the baking to produce special decorative or protective finishes.

Should it not be desired to add the modified bituminous emulsion to the fibrous pulp in certain cases, the emulsion may be applied to the semi-dry or dry board, and the board subjected to low temperature drying to remove the water and allow the bituminous material to penetrate into the board before it is subjected to the ultimate baking. In carrying out this process, it may be necessary to repeat the coating and drying several times, according to the quantity of bituminous material required in the final product.

Another application of the invention is the fabrication of articles at present made from the papier mache processes, from the board either in the dry or semi-dry condition.

When fully baked, the material is water resistant, petrol and oil resistant, of considerable rigidity and strength, and can be used for corrugated sheeting for roof work, floor tiles, insulation, building and other miscellaneous purposes.

The bituminized fiberboard product previously claimed in this application is now claimed in divisional application Ser. No. 286,421, filed May 6, 1952, for "Fiberboard."

I claim:

1. The method of producing rigid, non-flexible boards which comprises forming a sheet from approximately equal parts of fibrous material and a binder of fatty acid pitch mixed with sulphur in amount sufficient to accelerate hardening and modified with a hard bitumen, the ratio of fatty acid pitch to bitumen in the binder being between 1 to 2.4 and 3.5 to 1, gradually drying the sheet at a temperature not substantially exceeding 90° C. while passing air thereover, and thereafter baking the dried sheet at a temperature of from approximately 150° C. to 170° C. for a length of time sufficient to effect polymerization and hardening of the binder to produce a rigid, non-flexible bituminized fiber board.

2. The method of claim 1 in which the amount of bitumen in the binder is between about 2 to 2.4 times the amount of fatty acid pitch.

3. The method of claim 1 in which at least the major portion of the fibers are asbestos fibers.

4. The method of producing rigid, non-flexible boards which comprises forming a sheet from approximately equal parts of asbestos fibers and a binder of fatty acid pitch mixed with sulphur in amount sufficient to accelerate hardening and modified with a hard bitumen, the ratio of fatty acid pitch to bitumen in the binder being between about 1 to 2.4 and 3.5 to 1, gradually drying the sheet at a temperature below the fluxing temperature of the bitumen, and thereafter baking the dried sheet at a temperature greater than that at which the sheet was dried and sufficiently high to effect polymerization and hardening of the binder.

5. The method of producing rigid, non-flexible boards which comprises forming a sheet from approximately equal parts of asbestos fibers and a binder consisting essentially of a fatty acid pitch mixed with sulphur in amount sufficient to accelerate hardening and modified with a hard bitumen, the binder containing about 100 parts by weight of fatty acid pitch, from about 200 to 240 parts by weight of bitumen and from about 18 to 24 parts by weight of sulphur, gradually drying the sheet at a temperature below the fluxing temperature of the bitumen, and thereafter baking the dried sheet at a temperature above that at which it was dried and sufficiently high to effect polymerization and hardening of the binder to produce a rigid, non-flexible bituminized asbestos fiber board.

6. The method of claim 5 in which the sheet is dried at a temperature not substantially exceeding 90° C. and is baked at a temperature of from approximately 150° C. to 170° C.

LEONARD C. BRADSHAW.

REFERENCES CITED

The following references are of record in the file of this patent:

UNITED STATES PATENTS

| Number | Name | Date |
|---|---|---|
| 177,487 | Field | May 16, 1876 |
| 956,009 | Van Westrum | Apr. 26, 1910 |
| 1,420,882 | Stanley | Jan. 27, 1922 |
| 1,856,946 | Darrah | May 3, 1932 |
| 1,862,688 | Loetscher | June 14, 1932 |
| 1,900,698 | Ellis | Mar. 7, 1933 |
| 1,901,930 | Pieper | Mar. 21, 1933 |
| 1,956,866 | Keller | May 1, 1934 |
| 2,140,195 | Batcheller | Dec. 13, 1938 |
| 2,197,822 | Wood | Apr. 23, 1940 |
| 2,301,998 | Bernstein et al. | Nov. 17, 1942 |
| 2,338,839 | Coss | Jan. 11, 1944 |
| 2,360,645 | Bruce | Oct. 17, 1944 |

FOREIGN PATENTS

| Number | Country | Date |
|---|---|---|
| 319,101 | Great Britain | Sept. 19, 1929 |
| 357,594 | Great Britain | Sept. 25, 1931 |